United States Patent [19]
Delong

[11] Patent Number: 5,947,356
[45] Date of Patent: Sep. 7, 1999

[54] QUICK LATCH SYSTEM FOR TOOL BOX

[76] Inventor: Ronald C. Delong, 101 E. Needmore Hwy., Grand Ledge, Mich. 48837

[21] Appl. No.: 09/113,285

[22] Filed: Jul. 10, 1998

[51] Int. Cl.[6] .................................................. B60R 9/00
[52] U.S. Cl. ......................... 224/404; 224/557; 224/544; 296/43; 296/37.6; 411/354; 403/374.5; 403/DIG. 8
[58] Field of Search ..................... 224/400, 401, 224/402, 403, 404, 433, 522–526, 527, 539, 321, 328, 545, 555, 557, 558, 544; 411/32, 33, 354, 355; 403/DIG. 4, DIG. 8, 322.4, 374.5; 24/287; 410/81, 82; 296/37.6, 43

[56] References Cited

U.S. PATENT DOCUMENTS

| D. 395,388 | 6/1998 | Bourne et al. . | |
|---|---|---|---|
| 560,998 | 5/1896 | Johnson | 403/374.5 X |
| 1,245,560 | 11/1917 | Bowen . | |
| 3,192,820 | 7/1965 | Pitzer | 411/33 |
| 3,432,197 | 3/1969 | Albertine et al. | 411/354 X |
| 3,554,416 | 1/1971 | Bott . | |
| 3,709,088 | 1/1973 | Pitzer | 411/354 X |
| 3,920,167 | 11/1975 | Parsons . | |
| 4,500,020 | 2/1985 | Rasor . | |
| 4,531,774 | 7/1985 | Whatley | 224/404 X |
| 4,543,798 | 10/1985 | Page | 224/404 X |
| 4,911,348 | 3/1990 | Rasor et al. . | |
| 4,967,944 | 11/1990 | Waters . | |
| 5,037,153 | 8/1991 | Stark | 224/404 X |
| 5,052,737 | 10/1991 | Farmer, Jr. | 224/404 X |
| 5,083,829 | 1/1992 | Fonseca | 224/404 X |
| 5,169,200 | 12/1992 | Pugh . | |
| 5,207,469 | 5/1993 | Rossi | 224/404 X |
| 5,395,019 | 3/1995 | Christensen | 296/37.6 X |
| 5,642,845 | 7/1997 | Van Kooten . | |
| 5,657,916 | 8/1997 | Tackett | 224/404 |
| 5,779,117 | 7/1998 | Rogers et al. | 224/404 X |

FOREIGN PATENT DOCUMENTS

| 294394 | 7/1953 | Australia . |
|---|---|---|
| 1092494 | 4/1955 | France . |
| 1477088 | 3/1967 | France . |

*Primary Examiner*—Gregory M. Vidovich
*Attorney, Agent, or Firm*—Richard C. Litman

[57] ABSTRACT

A quick latch system for attaching a toolbox to the side panels of a pickup truck. A shaft is attached to a clamp arm, forming a pivot. The shaft is inserted through a hole in the base of the toolbox, and a fastener is attached to the end of the shaft. The shaft is dropped into the box in the side panel of the pickup truck, and the clamp arm is rotated, thereby moving the fastener upwards towards the base of the toolbox. When the clamp arm is snug with the base of the toolbox, the clamp arm is pivoted to a horizontal position, clamping the toolbox to the side panel.

8 Claims, 4 Drawing Sheets

QUICK LATCH SYSTEM FOR TOOL BOX

BACKGROUND OF THE INVENTION

1. Field of the Invention

The present invention relates to quick latch systems for toolboxes, and more specifically to quick latch systems for securing a toolbox to the side panels of a pickup truck.

2. Description of the Related Art

Cargo beds of pickup trucks are convenient for transporting a variety of articles. However, due to the forces exerted on those articles during driving, they are subject to shifting within the cargo bed. Those articles may become damaged by striking the side panels of the pickup truck, and can possibly be thrown from the cargo bed. The danger of damage to or loss of articles stored in cargo beds during driving is especially high for smaller articles, such as toolboxes, which cannot easily be secured.

The necessity for securing toolboxes within the cargo bed of pickup trucks has led to the invention of toolboxes specifically designed for attachment to the side panels of a pickup truck. U.S. Pat. No. 4,967,944 discloses a truck toolbox that fits across the bed of a pickup truck. The patent discloses the use of suitable means such as screws to anchor the toolbox to the upper surface of the side panels of the pickup truck. Similarly, U.S. Pat. No. 5,169,200 discloses a storage box that lies across the bed of a pickup truck and is secured to the side panels of the pickup truck by driving fasteners such as screws into the truck walls. Both the toolbox disclosed in U.S. Pat. No. 4,967,944 and the storage box disclosed in U.S. Pat. No. 5,169,200 have the disadvantage of requiring holes to be drilled in the body of the pickup truck.

To circumvent the necessity of drilling holes through the body of the pickup truck, several attachment structures for securing a toolbox to the side panels have been invented. U.S. Pat. No. 5,052,737 discloses an attachment structure that secures the toolbox to the inside vertical wall portion of the side panels. U.S. Pat. No. 5,642,845 discloses a locking device that utilizes a handle that can be raised and lowered to position a locking bar underneath the top surface of the side panels, securing the toolbox in place. Although these devices do not require drilling new holes in the body of the truck, they do not take advantage of the post holes already existing in the side panels. Furthermore, since these devices rely on friction between the locking device and the side panels to secure the toolbox, they will not keep the toolbox as securely positioned as will a locking device engaging permanently located holes.

Clamping mechanisms provide a useful method for securing a device at a specific location. Clamping mechanisms for use on automobiles have been disclosed in prior patents. U.S. Pat. No. 4,911,348 discloses an adjustable cross rail for a luggage carrier mounted on the roof of an automobile. A lever is pivoted to a vertical position and rotated, loosening the grip between the cross rail and the horizontal tracks and allowing the cross rail to slide along the tracks. The lever is then clamped into a horizontal position to lock the cross rail in place. U.S. Pat. Nos. 4,500,020 and 3,554,416 similarly disclose article carriers that are mounted on the roof of an automobile and use clamping members to secure cross rails along a longitudinal track. U.S. Pat. No. 3,920,167 discloses an automobile roof rack using a clamping mechanism to secure the rack to the rain gutter. While these patents disclose clamping mechanisms for use on automobiles, none of these patents disclose the use of such clamping mechanisms for securing a toolbox to the side panels of a pickup truck.

Therefore, there exists a need for a device for securely attaching a toolbox to the side panels of a pickup truck that utilizes a clamping mechanism and does not require the drilling of permanent holes in the body of the truck.

None of the aforementioned patents, taken either singularly or in combination, is seen to describe the present invention as claimed. Thus, a quick latch system for securing a toolbox to the sidewalls of a pickup truck utilizing the already existing post holes in the flat horizontal upper portion of the side panels is desired.

SUMMARY OF THE INVENTION

The present invention is a quick latch system for securing a toolbox to the side panels of a pickup truck. The toolbox has either a single base or a plurality of bases that rest on one or both of the side panels of the truck. Each base resting on a side panel has a hole that is aligned with a post hole located in the top surface of the side panel. A shaft, attached to a clamp arm, is inserted through the toolbox. The shaft and the clamp arm are attached so that the clamp arm can be pivoted from a horizontal to a vertical position. The end of the clamp arm that attaches to the shaft can have a contoured cam surface for increasing the pressure between the toolbox and the side panel of the pickup truck when the clamp arm is pivoted from a vertical to a horizontal position. A fastener is attached to the end of the shaft that is inserted through the hole. The fastener is shaped so it can be dropped through the post hole and into the box, and rotated to a position in which it will not come out of the box.

A layer of rubber or other cushioning material can be attached to the bottom of the toolbox, thereby providing a layer of cushioning between the toolbox and the side panels of the truck. Such cushioning protects the top surface of the side panels against scratches.

Accordingly, it is a principal object of the invention to provide a quick latch system for attaching a toolbox to a pickup truck.

Furthermore, it is an object of the invention to provide such a quick latch system that utilizes the existing post holes in the side panels of the pickup truck, thereby eliminating the need to drill holes in the body of the pickup truck.

It is a further object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
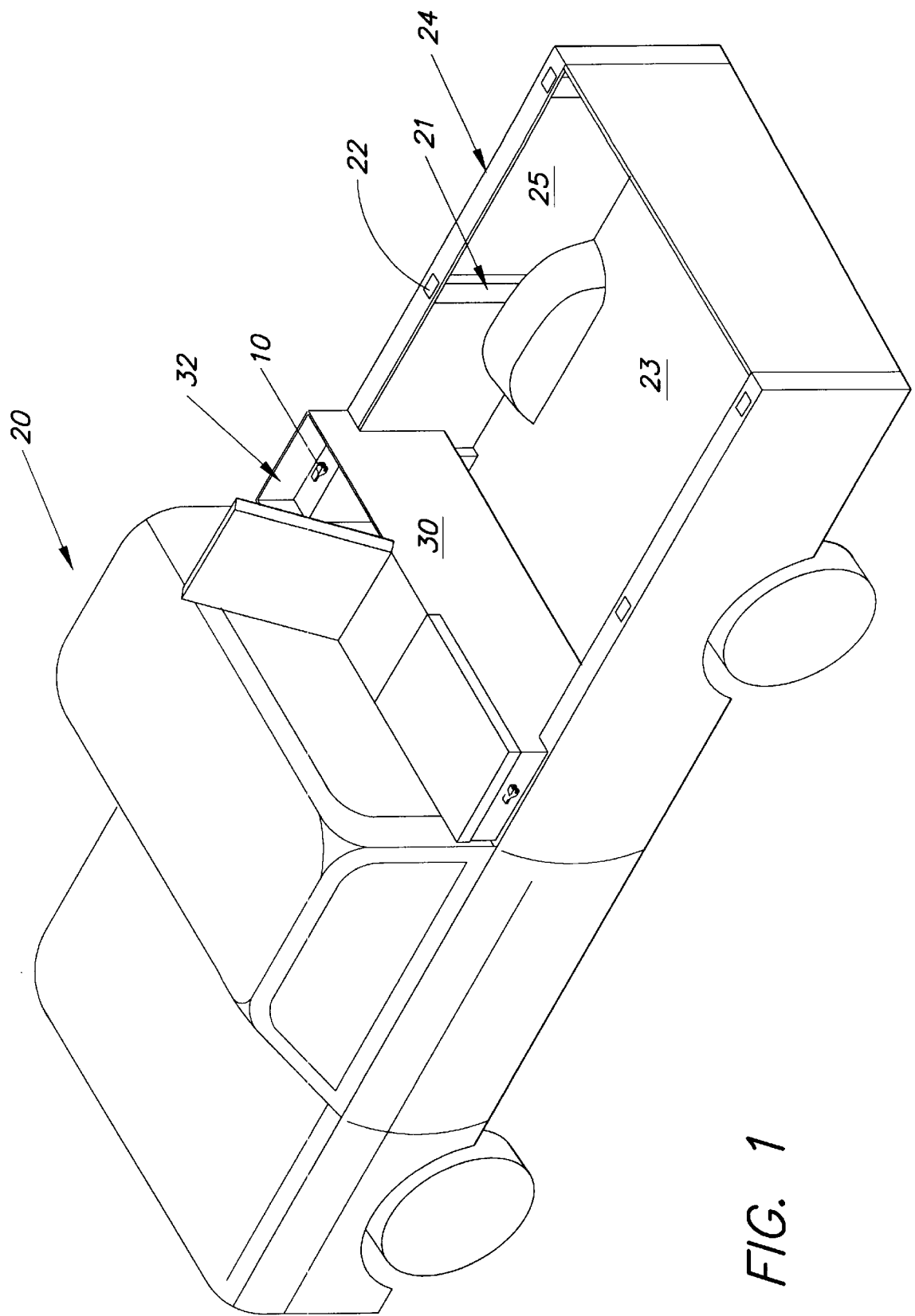
FIG. 1 is an environmental, perspective view of a quick latch system for a tool box as used on a pickup truck according to the present invention.
Figure 2:
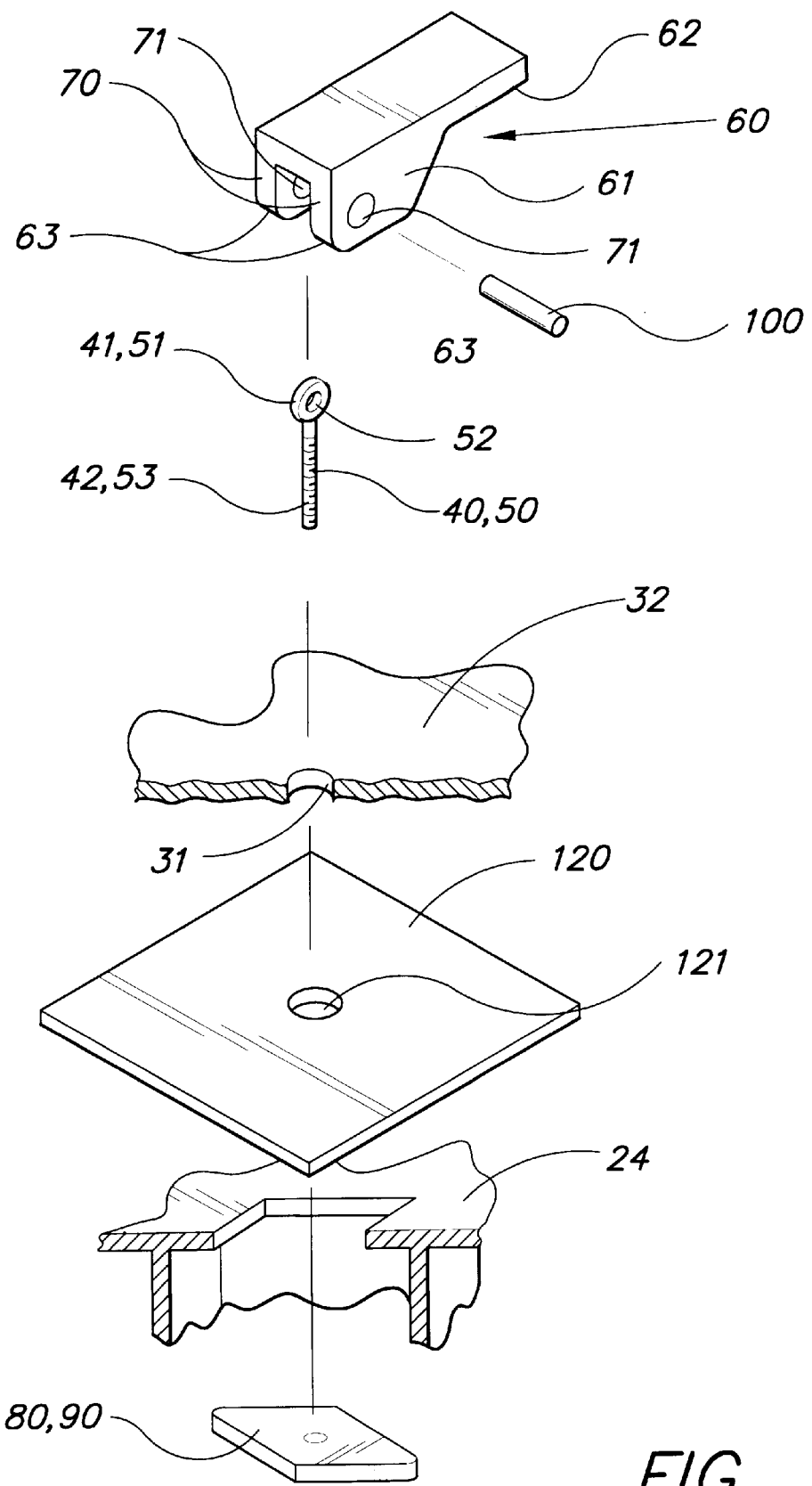
FIG. 2 is a fragmented view of the quick latch system.
Figure 3:
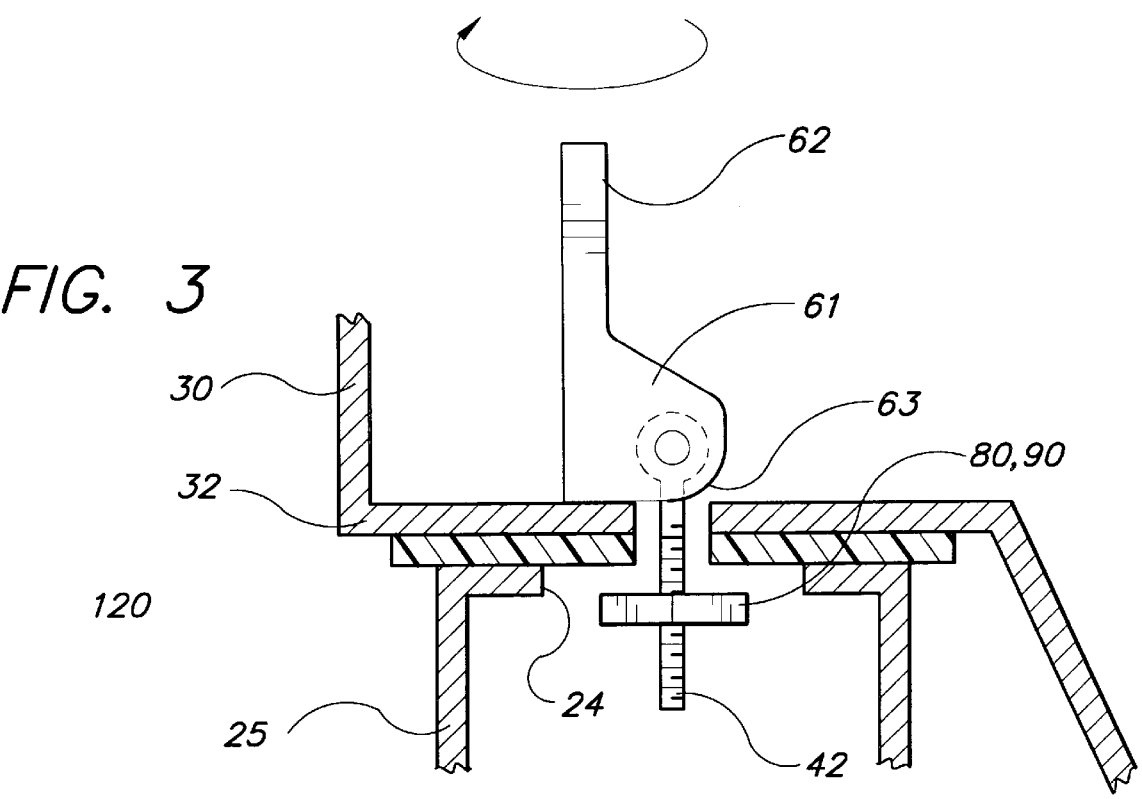
FIG. 3 is a sectional view of the quick latch system before being secured on a side panel.
Figure 4:
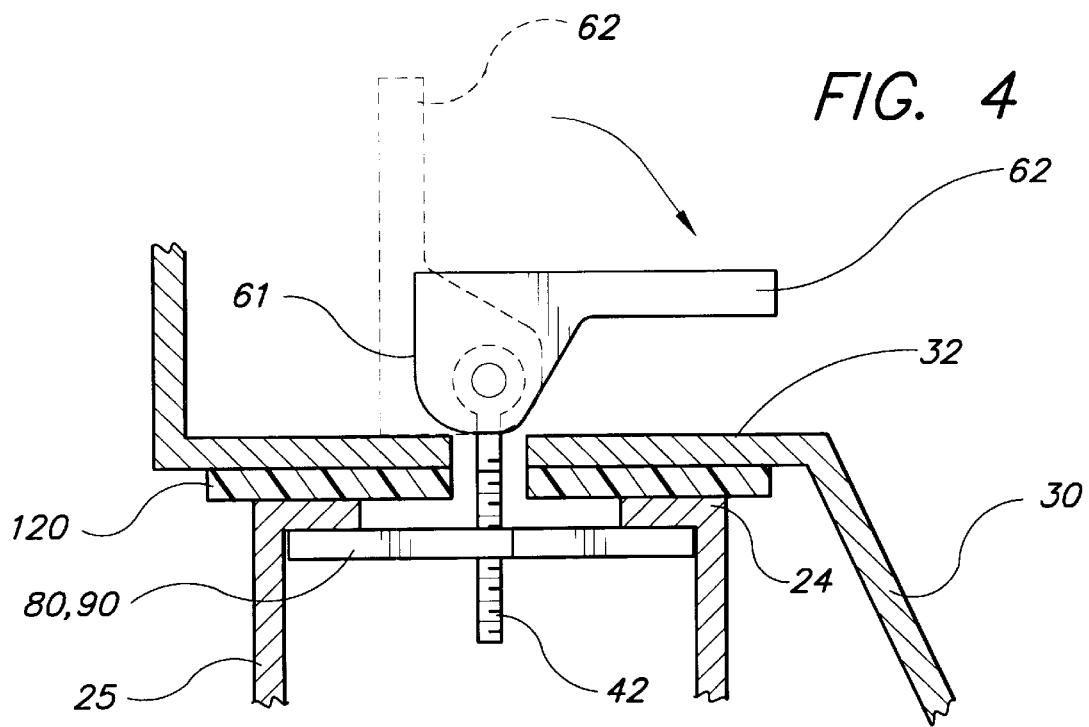
FIG. 4 is a sectional view of the quick latch system being secured on a side panel.

Referring now to the figures, the present invention is a quick latch system 10. The quick latch system is designed for use with a motor vehicle such as a pickup truck 20 having boxes 21 with post holes 22. A truck typically has six boxes 21, three of which are located on either side of the bed 23 of the pickup truck 20. Each box 21 extends from the top surface 24 of a side panel 25 of the pickup truck 20 to the bed 23. Within the portion of the top surface 24 of the side panel 25 that lies directly above each box 21 is a post hole 22. The quick latch system is used to attach a toolbox 30 to the top surface 24 of a side panel 25 of the pickup truck 20.

Broadly defined, the quick latch system 10 comprises a toolbox 30 having a hole 31 in its base 32, a shaft 40, a clamp arm 60, and a fastener 80. The toolbox 30 may be of the type that lies across the bed 23 of the pickup truck and has a plurality of bases 32, two of which rest on the side panels 25, such as the toolbox 30 depicted in FIG. 1. However, the toolbox 30 may be of any type having a base 32 that can rest on either one or both of the side panels 25 of the pickup truck 20. Any base 32 of the toolbox 30 that rests on a side panel 25 has a hole 31 that is aligned with a post hole 22 in the top surface 24 of that side panel 25.

The shaft 40 has an attaching end 41 that attaches to the clamp arm 60, and an inserting end 42 that attaches to the fastener 80. The diameter of the inserting end 42 is smaller than the diameter of the hole 31 in the base 32 of the toolbox 30. Preferably, the shaft 40 is an eyebolt 50, having an eye 51 with an eye hole 52 and a threaded shaft 53.

The shaft 40 is pivotally connected to the clamp arm 60. The clamp arm 60 has a clamping end 61 and an arm 62 extending from the clamping end 61. The clamping end 61 is pivotally attached to the attaching end 41 of the shaft 40. The clamping end 61 preferably has two forks 70, each fork 70 having a hole 71 of equal diameter to the eye hole 52 in the eye 51 of the eyebolt 50. The eye 51 of the eyebolt 50 fits between the two forks 70, and the holes 71 in the forks 70 and the eye hole 52 in the eyebolt 50 are aligned. In the preferred embodiment of the quick latch system 10, a dowel 100 is inserted through the aligned holes to form the pivot at the clamping end 61 of the clamp arm 60 and the attaching end 41 of the shaft 40.

The clamping end 61 of the clamp arm 60 can have a contoured cam surface 63 which, in combination with the shaft 40, creates a camming mechanism. The effect of the contoured cam surface 63 is to force the fastener 80 attached to the inserting end 42 of the shaft 40 closer to the clamping end 61 when the clamp arm 60 is pivoted from a vertical to a horizontal position. The camming action increases the pressure between the toolbox 30 and the top surface 24 of the side panel 25, thereby holding the toolbox 30 to the side panel 25 more securely.

The arm 62 of the clamp arm 60 is shaped so that it can be held in a vertical position and used to rotate the clamp arm 60, thereby rotating the shaft 40 within the hole 31 in the toolbox 30. The arm 62 can also be used to pivot the clamp arm 60 to a horizontal position to clamp the toolbox 30 to the side panel 25 of the truck 20.

Figure 5:
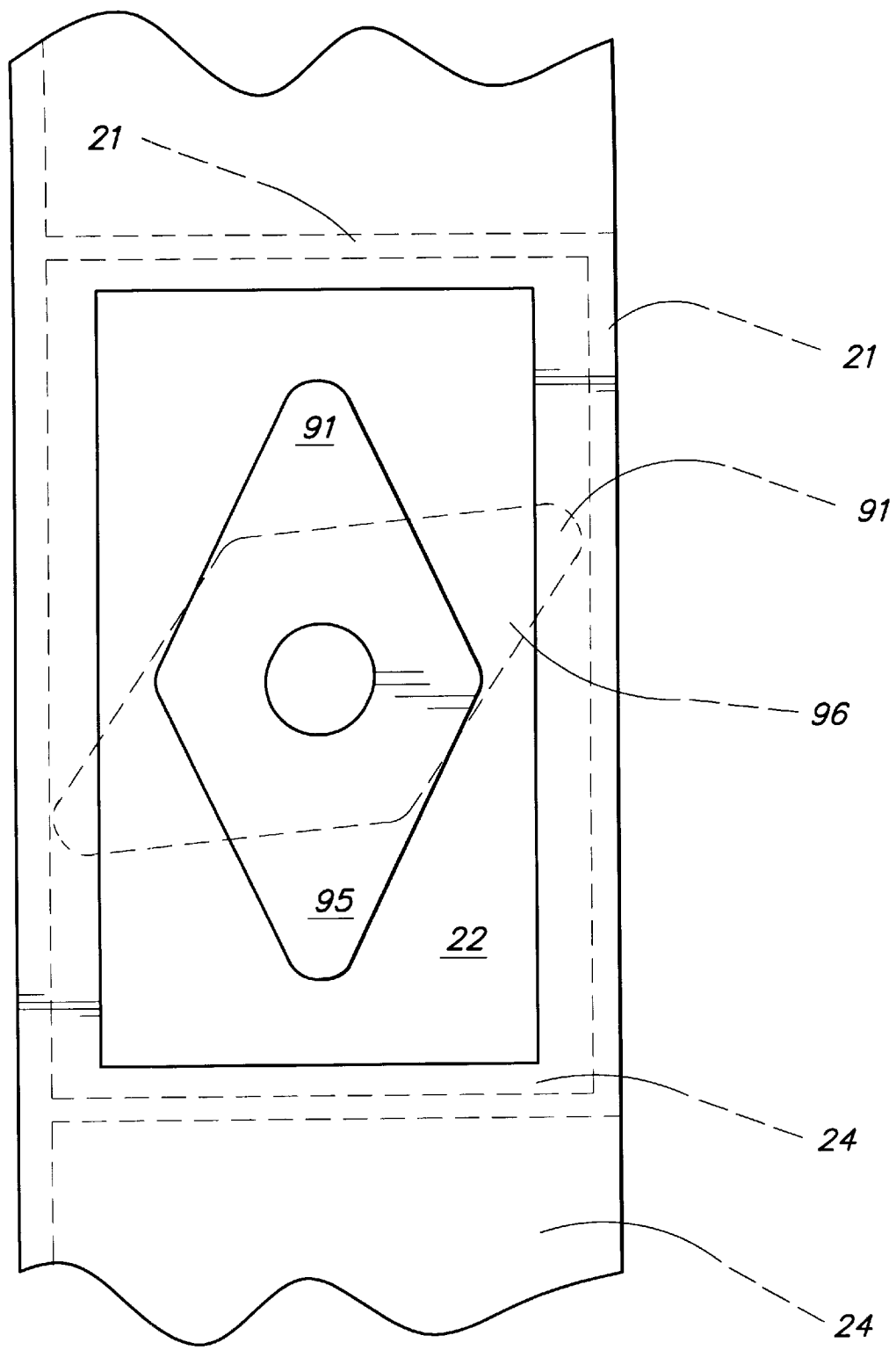
FIG. 5 is an elevational view of the fastener within a box.

A fastener 80 is secured to the inserting end 42 of the shaft 40. The fastener 80 engages the inside portion of the top surface 24 of the side panel 25 that surrounds the post hole 22 so that the quick latch system 10 can hold the toolbox 30 in place on the side panel 25. The fastener 80 is preferably a nut 90 having a rhombic shape that is screwed onto the threaded end 42 of the eyebolt 40. The nut 90 has a rhombic shape so that it can be dropped through the post hole 22 and into the box 21, and so that when the nut 90 is rotated, its corners 91 will abut the sides of the box 21, preventing it from further rotating with the eyebolt 40. Furthermore, when the corners 91 of the nut 90 abut the sides of the box 21, the tops of the abutting corners 91 will also abut the inside portion of the top surface 24 of the side panel 25 that surrounds the post hole 22, thereby preventing the nut 90 from coming out of the box 21 when the quick latch system 10 is secured. FIG. 5 shows how the nut 80 drops into and is secured inside the box 21. The nut 95 drawn with solid lines represents the orientation of the nut 95 when initially dropped through the post hole 22 and into the box 21. The nut 96 drawn with broken lines represents the orientation of the nut 96 when its corners 91 are abutting the sides of the box 21, so that the nut 96 cannot come out of the box 21.

A layer of rubber 120 or other suitable cushioning material may be attached to the base 32 of the toolbox 30 to provide cushioning between the toolbox 30 and the side panel 25 of the pickup truck 20. The layer of rubber 120 has an adhesive on one side for attaching the layer of rubber 120 to the base 32 of the toolbox 30. The layer of rubber 120 also has a hole 121 through which the inserting end 42 of the shaft 40 is passed. The hole 121 is aligned with the hole 31 in the base 32 of the toolbox 30, and has a diameter greater than the diameter of the inserting end 42 of the shaft 40.

To use the quick latch system 10, the shaft 40 is inserted through the hole 31 in the base 32 of the toolbox 30. The fastener 80 is then attached to the inserting end 42 of the shaft 40. The fastener 80 is dropped through the post hole 22 and into the box 21 of the pickup truck 20. The clamp arm 60 is held in a vertical position and rotated clockwise to move the fastener 80 upwards towards the base 32 of the toolbox 30. The fastener 80 is oriented within the hole 22 so that it cannot come out of the hole 22. When the clamp arm 60 is snug with the base 32 of the toolbox 30, the clamp arm 60 is pivoted to a horizontal position, clamping the toolbox 30 to the side panel 25 of the pickup truck 20. If the toolbox 30 rests on both side panels 25, the same procedure is repeated to secure the toolbox 30 to the other side panel 25.

To release the toolbox 30, the clamp arm 60 is pivoted to a vertical position and rotated counterclockwise until the clamp arm 60 is no longer snug with the base 32 of the toolbox 30. Then, the clamp arm 60 is rotated so that the fastener 80 lies in a position in which it can fit through the post hole 22. The fastener 80 is pulled through the post hole 22 and out of the box 21, and is further unscrewed until it is no longer attached to the shaft 60. The shaft 60 can then be removed from the hole 31 in the toolbox 30.

It is to be understood that the present invention is not limited to the embodiment described above, but encompasses any and all embodiments within the scope of the following claims.

I claim:

1. A quick latch system for use with a motor vehicle having side panels with post holes, said quick latch system comprising:

a toolbox having a base with a hole;

a shaft having an attaching end and an inserting end for passing through and rotating within the hole in said toolbox;

a clamp arm having a clamping end and a clamping arm extending from said clamping end, said clamping end being pivotally attached to said shaft, and said clamping arm adapted for rotating said shaft within the hole in said toolbox and for pivoting said clamp arm from a vertical position to a horizontal position; and a fastener adapted to attach to the inserting end of said shaft;

wherein said fastener has a rhombic shape to allow insertion into one of said post holes in one position and prevent withdrawal of said fastener in another position.

2. The quick latch system set forth in claim 1 wherein the clamping end of said clamp arm comprises a first fork and a second fork, said first fork having a first hole and said second fork having a second hole, said first hole and said second hole being in registry and approximating each other in diameter.

3. The quick latch system set forth in claim 2 wherein the shaft is an eyebolt having an eye with an eye hole approximating the diameter of said first hole and said second hole in the clamping end of said clamp arm, said eye fitting between said first fork and said second fork so that said eye hole is aligned with said first hole and said second hole.

4. The quick latch system set forth in claim 3 further comprising a dowel inserted through the holes in the forks of said clamp arm and through the eye hole in the eye of said shaft, whereby said clamp arm and said eyebolt are pivotally attached to each other.

5. The quick latch system set forth in claim 1 wherein the clamping end of said clamp arm has a contoured cam surface.

6. The quick latch system set forth in claim 1 wherein the inserting end of said shaft has threads.

7. The quick latch system set forth in claim 6 wherein said fastener is a nut.

8. The quick latch system set forth in claim 1 further comprising a layer of cushioning secured to the outside of the base of the toolbox, said layer having a hole aligned with the hole in the toolbox for passing said shaft therethrough.

\* \* \* \* \*